A. P. LITREM.
PERMUTATION LOCK FOR AUTOMOBILES.
APPLICATION FILED NOV. 28, 1919.

1,417,340.

Patented May 23, 1922.
2 SHEETS—SHEET 1.

INVENTORS
ANDRÉ PIERRE LITREM
BY
ATTORNEYS

A. P. LITREM.
PERMUTATION LOCK FOR AUTOMOBILES.
APPLICATION FILED NOV. 28, 1919.

1,417,340.

Patented May 23, 1922.
2 SHEETS—SHEET 2.

Fig.11ᵃ.

INVENTOR
ANDRE PIERRE LITREM
BY
ATTORNEYS

UNITED STATES PATENT OFFICE.

ANDRÉ PIERRE LITREM, OF PARIS, FRANCE.

PERMUTATION LOCK FOR AUTOMOBILES.

1,417,340.  Specification of Letters Patent.  Patented May 23, 1922.

Application filed November 28, 1919. Serial No. 340,992.

*To all whom it may concern:*

Be it known that I, ANDRÉ PIERRE LITREM, a citizen of the Republic of France, and a resident of 48 Rue Crozatier, Paris, France, engineer, have invented a Permutation Lock for Automobiles, of which the following is a clear, full, and exact description.

It has already been sought to prevent the theft of motor cars by means of devices putting the ignition of the motor out of action, or locking certain parts of the car.

The putting out of action of the ignition or the locking of the change speed gear renders the theft more difficult, but do not constitute absolutely efficient means, as they do not prevent from taking the car in tow.

The most efficient means consists in locking the steering gear, as, in this case, the car can be driven neither alone or in tow.

This invention relates to a permutation lock particularly applicable to the steering gear of an automobile, allowing to lock the latter or to release it, at will, in a very simple and rapid manner giving the greatest security.

This device is essentially characterized by a bolt carried by the outer tube of the steering gear; this bolt may be engaged in the tube or rod integral with the steering pillar and is maintained in its locking position by a combination system allowing the displacement of the said bolt only if its elements are at the chosen combination.

The invention is, moreover, characterized by the special arrangement of the combination system, composed of a series of rotating elements exteriorly bearing digits or letters and provided with notches allowing the passage of studs or hooks carried by the stem of the bolt, when these elements occupy the required position. These elements are each composed of two members, the position of which may be varied so as to allow of altering the combination at will. Moreover, the elements are entirely separated by intermediate fixed elements which render each of them independent from the other elements.

The accompanying drawings illustrate, by way of example, a form of execution of the locking device.

In these drawings:—

Figure 12:
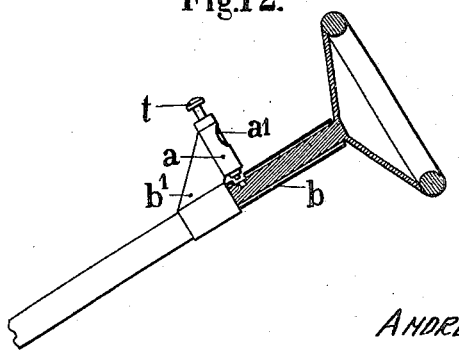

Figs. 4 to 11$^a$ are detail views;

Fig. 12 shows the new device in position.

As shown in these drawings, in the example illustrated, the improved device comprises a tube $a$ forming a casing, adapted to be securely fastened on the steering pillar $b$, Fig. 12, for instance by means of a strong angle bracket $b^1$.

In the upper part of this tube, which is enlarged, is arranged the combination device comprising a series of similar superposed elements.

Figure 1:
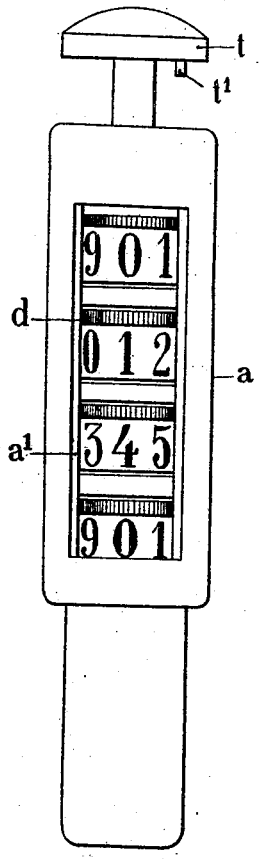
Figure 1 is an outside view of the new device.
Figure 2:
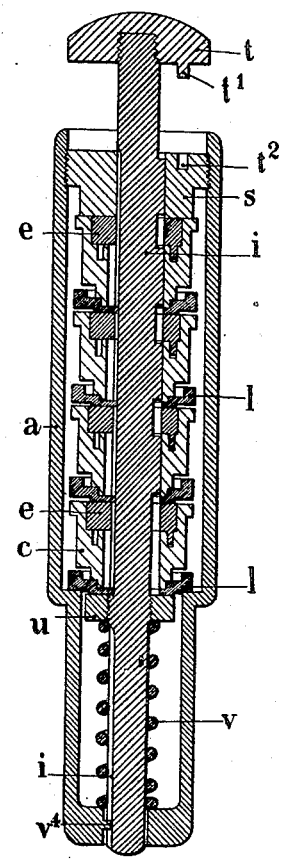
Fig. 2 is a vertical section.
Figure 6:
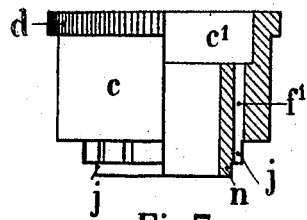
Figure 7:
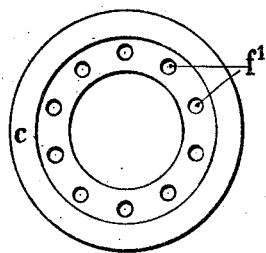

Each element comprises a drum $c$, shown separately in Figs. 6 and 7, provided with a milled portion $d$ projecting in an opening $a^1$ of the tube, Fig. 1, so as to allow of rotating this drum when desired.

Figure 4:
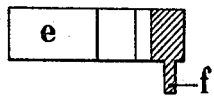
Figure 5:
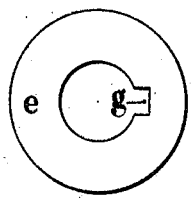

The said drum is provided with a cup $c^1$, Fig. 6, in which may be fitted a washer $e$, shown separately in Figs. 4 and 5.

Figure 10:
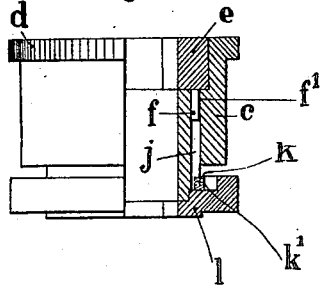
Figure 10:
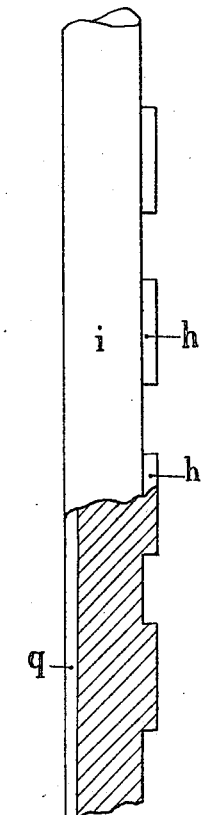

This washer carries a pin $f$ capable of entering into one of the corresponding holes $f^1$ of the drum, as illustrated in Fig. 10; it results therefrom that the washer $e$ may occupy relatively to this drum $c$, a number of positions equal to the number of holes $f^1$; to each hole corresponds one of the letters or digits inscribed on the periphery of the drum, Fig. 1.

The said washer $e$ is recessed at its center and is provided with a notch $g$, Fig. 5, adapted to allow the passage of a corresponding stud $h$, carried by the bolt $i$, Fig. 11, as will be explained hereafter.

In the lower part of the drum are formed notches $j$ which may be obtained, in practice, by extending the holes $f^1$ to the base of the drum.

Figure 9:
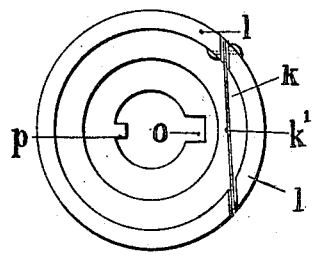

In these notches fits the boss of a spring $k$, Figs. 9 and 10, secured to a part $l$ which is the intermediate washer separating two consecutive elements.

Figure 8:
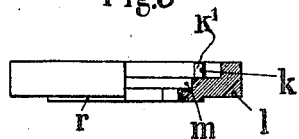

This washer $l$ which is shown separately in Figs. 8 and 9, is provided with a cup $m$ in which rests the base $n$ of a small projecting part formed on the lower portion of the drum $c$, Fig. 6.

Figure 11:
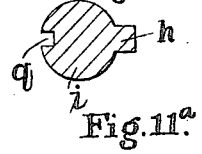

In the washer $l$ is formed a notch $o$, Fig. 9, adapted to let freely pass the stud $h$ of the bolt, Fig. 11, and this washer is provided with a projection $p$ fitting in a slot $q$ of this bolt.

The base of the intermediate washer $l$ is provided with a projecting portion $r$ which rests on the washer $e$ of the element located underneath.

These various members, when assembled, occupy the position shown in Fig. 10.

The bolt $i$ has a series of studs $h$, as above stated, the number of which is equal to that of the elements of the combination. Its upper part passes through the threaded plug $s$ which screws into and closes the upper part of the tube $a$, Fig. 3, and terminates in a knob $t$ threaded thereon and carrying a stud $t^1$ adapted to enter into a corresponding hole $t^2$ of the plug $s$.

On this bolt is secured a washer $u$ bearing on a spring $v$ located in the base of the tube $a$.

The bolt passes through the base of this tube. It is guided by a projection $v^1$ fitting in a slot $i^1$, in the bolt in such a manner that it can slide parallel to itself, but cannot turn.

The operation is as follows:—

Suppose it is desired to lock the steering gear of the vehicle provided with the improved device.

This device being in the position indicated in Fig. 1, the milled portion of the drum $c$ is acted upon from the exterior, so as to bring in the axis of the opening or window the digits or letters of the combination.

Each drum is successively acted upon. For each of them, the operation is facilitated by the click produced by the boss $k^1$ of the small spring $k$ falling in the notches which are presented in front of the same. As the washers $l$ are stationary at the time the drums are being set, the spring $k$ arrests the drum when in proper position and holds it in this position.

It will be noted that by acting on a drum, there is no risk of actuating the other drums, as the drum under consideration is separated from the other drums by the two adjacent intermediate washers. These washers are fixed, their projections $p$, engaged in the slot $q$ of the bolt, preventing them from turning.

When all the drums have been brought to the required position, the washers $e$ which rotate therewith present all their openings $g$ opposite the studs $h$.

If at this moment, the knob $t$ is pressed upon, the bolt can move downward through the entire column of the combination elements; the studs $h$ pass through the openings $g$ and notches $o$.

By holding the knob $t$ in its depressed position, so as to compress the spring $v$, the drums are caused to rotate, thus mingling the combination.

Figure 3:
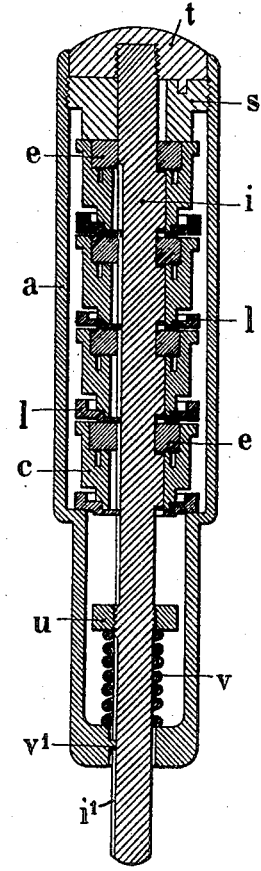
Fig. 3 is a section similar to that of Fig. 2, in which the parts occupy another position.

The knob may then be released; the bolt is held by the studs $h$ engaged under the washers $e$, position illustrated in Fig. 3.

In this position, the end of the bolt which projects outside, enters the inner tube of the steering gear and prevents it from turning.

It will be seen that the stud $t^1$ entering into the recess $t^2$, renders the knob $t$ rigid with the plug $s$. One of the screw connections connecting the knob to the bolt and the plug to the tube has a right-hand thread and the other a left-hand thread, so that in the position shown in Fig. 3, it is impossible to unscrew simultaneously the knob and plug.

For opening, the drums are set back to the required combination and the bolt is pushed out of its recess under the action of its spring.

For altering the chosen combination, the knob $t$ and plug $s$ are unscrewed, thus allowing the bolt and the entire mechanism to be removed. The various washers may be spaced apart and the relative position of the washers $e$ relatively to the drums $c$ may be modified.

It will be seen that the drums rest upon the intermediate washers and the latter in their turn rest upon the washers $e$ located underneath, through very reduced surfaces so that the friction on these surfaces is small and that no force is to be exerted for obtaining the rotation of the drums.

The above arrangements are given only by way of example; the forms, dimensions, materials used and detail arrangements may be varied according to circumstances without departing thereby from the nature of the invention.

Claims—

1. In a locking device for automobiles, a casing having an opening, a plurality of combination elements in the casing and provided with notches, a bolt extending through the elements and provided with studs for engaging the notches thereof, intermediate washers separating the elements, means for preventing the washers from turning, and a spring secured to each intermediate washer for engaging with the corresponding element.

2. In a locking device for automobiles, a casing having an opening, a plurality of combination elements in the casing and provided with notches, a bolt passing through the elements and provided with studs for engaging the notches of said elements, intermediate washers separating the elements, said washers being provided with notches at its rim, and a spring plate secured in the notches of the washers, said springs engaging with the corresponding element.

3. In a locking device for automobiles, a casing having an opening, a plurality of combination elements in the casing and provided with notches, a bolt extending through the elements and provided with studs for engaging the notches thereof, intermediate washers separating the elements, means for preventing the washers from turning, a spring secured to each intermediate washer, a boss on the spring, and a notch in the element in which fits the said boss.

4. In a locking device for automobiles, a casing, a plurality of combination elements in the casing and provided with notches, a bolt passing through the elements and having studs for engaging the notches of the elements, intermediate washers separating the elements, means for preventing the washers from turning, a knob on the end of the bolt, and provided with a stud, and a nut closing the casing and having a groove to receive the stud of the knob, the knob and nut having screw threaded connections with the bolt and casing respectively, one of which connections is a right hand and the other a left hand.

5. A locking device for automobiles, comprising a casing having a longitudinal slot, a plurality of combination elements mounted in the casing and each provided with a notch, washers separating the elements and each provided with a notch and a stud, a bolt mounted in the casing and passing through the elements, said bolt having a longitudinal groove to receive the studs of the washers and provided with spaced studs for engaging the notches of the elements and washers, and a spring carried by the washers for arresting the elements when in proper position.

The foregoing specification of my safety device for preventing the theft of motor cars, signed by me this 31" day of October, 1919.

ANDRÉ PIERRE LITREM.

In the presence of—
HENRY T. WILCOX,